United States Patent
Britt, Jr.

(10) Patent No.: US 7,107,349 B2
(45) Date of Patent: Sep. 12, 2006

(54) SYSTEM AND METHOD FOR DISABLING AND PROVIDING A NOTIFICATION FOR A DATA PROCESSING DEVICE

(75) Inventor: Joe Freeman Britt, Jr., Los Gatos, CA (US)

(73) Assignee: Danger, Inc., Palo Alto, CA (US)

( * ) Notice: Subject to any disclaimer, the term of this patent is extended or adjusted under 35 U.S.C. 154(b) by 0 days.

(21) Appl. No.: 10/262,045

(22) Filed: Sep. 30, 2002

(65) Prior Publication Data

US 2004/0267944 A1   Dec. 30, 2004

(51) Int. Cl.
*G06F 15/16* (2006.01)
(52) U.S. Cl. ............ 709/229; 455/410; 455/411
(58) Field of Classification Search ........ 709/208–210; 455/403, 410, 411, 418–420; 713/200, 201; 375/220; 379/350, 372
See application file for complete search history.

(56) References Cited

U.S. PATENT DOCUMENTS

| | | | |
|---|---|---|---|
| 5,159,592 A | 10/1992 | Perkins | |
| 5,559,800 A | 9/1996 | Mousseau et al. | |
| 5,594,910 A | 1/1997 | Filepp et al. | |
| 5,715,387 A | 2/1998 | Barnstijin et al. | |
| 5,727,159 A | 3/1998 | Kikinis | |
| 5,727,202 A | 3/1998 | Kucala | |
| 5,734,978 A * | 3/1998 | Hayatake et al. | 455/410 |
| 5,748,084 A * | 5/1998 | Isikoff | 340/568.1 |
| 5,778,176 A | 7/1998 | Geihs et al. | |
| 5,790,974 A | 8/1998 | Tognazzini | |
| 5,802,312 A | 9/1998 | Lazaridis et al. | |
| 5,816,620 A * | 10/1998 | Buell | 283/74 |
| 5,915,095 A | 6/1999 | Miskowiec | |
| 5,961,590 A | 10/1999 | Mendez et al. | |
| 5,964,830 A | 10/1999 | Durrett | |
| 5,987,609 A * | 11/1999 | Hasebe | 713/200 |
| 6,023,708 A | 2/2000 | Mendez et al. | |
| 6,035,339 A | 3/2000 | Agraharam et al. | |
| 6,076,109 A | 6/2000 | Kikinis | |
| 6,087,937 A * | 7/2000 | McCarthy | 340/567 |
| 6,151,677 A | 11/2000 | Walter et al. | |
| 6,157,935 A | 12/2000 | Tran et al. | |
| 6,166,734 A | 12/2000 | Nahi et al. | |
| 6,167,441 A | 12/2000 | Himmel | |
| 6,199,099 B1 | 3/2001 | Gershman et al. | |
| 6,286,063 B1 | 9/2001 | Bolleman et al. | |
| 6,330,618 B1 | 12/2001 | Hawkins et al. | |
| 6,336,137 B1 | 1/2002 | Lee et al. | |
| 6,362,736 B1 * | 3/2002 | Gehlot | 340/568.1 |

(Continued)

FOREIGN PATENT DOCUMENTS

WO   WO 98/36344   8/1998

(Continued)

OTHER PUBLICATIONS

Excite Home Page, http://www.excite.com/, 1 page Aug. 1, 2000.

(Continued)

*Primary Examiner*—William C. Vaughn, Jr.
*Assistant Examiner*—Joseph Maniwang
(74) *Attorney, Agent, or Firm*—Blakely, Sokoloff, Taylor & Zafman LLP

(57) ABSTRACT

A method for disabling a wireless data processing device is described comprising: receiving an indication from a user that the data processing device is missing; and responsively transmitting a disable command to the data processing device, the disable command disabling the data processing device using a first disabling technique.

35 Claims, 3 Drawing Sheets

U.S. PATENT DOCUMENTS

| | | |
|---|---|---|
| 6,370,687 B1 | 4/2002 | Shimura |
| 6,396,482 B1 | 5/2002 | Griffin et al. |
| 6,418,310 B1 | 7/2002 | Dent |
| 6,418,533 B1 * | 7/2002 | Angelo et al. ............... 713/202 |
| 6,438,601 B1 | 8/2002 | Hardy |
| 6,542,730 B1 * | 4/2003 | Hosain ....................... 455/410 |
| 6,622,175 B1 | 9/2003 | Piller |
| 6,643,781 B1 * | 11/2003 | Merriam .................... 713/201 |
| 6,662,023 B1 * | 12/2003 | Helle ......................... 455/558 |
| 6,687,497 B1 * | 2/2004 | Parvulescu et al. ......... 455/420 |
| 6,742,027 B1 * | 5/2004 | Cromer et al. .............. 709/223 |
| 6,804,699 B1 * | 10/2004 | Henrie ....................... 709/203 |
| 6,813,487 B1 * | 11/2004 | Trommelen ............. 455/404.1 |
| 6,813,498 B1 * | 11/2004 | Durga et al. ............. 455/456.1 |
| 6,918,056 B1 * | 7/2005 | Paek ........................... 714/27 |
| 2002/0007454 A1 | 1/2002 | Tarpenning et al. |
| 2002/0010757 A1 | 1/2002 | Granik et al. |
| 2003/0065934 A1 * | 4/2003 | Angelo et al. ............... 713/200 |
| 2003/0181219 A1 * | 9/2003 | Huang ........................ 455/558 |

FOREIGN PATENT DOCUMENTS

| | | |
|---|---|---|
| WO | WO 00/30003 | 5/2000 |

OTHER PUBLICATIONS

Alta Vista Home Page, http://www.altavista.com/, 1 Page Aug. 1, 2000.

Yahoo Home Page, http://www.yahoo.com/, 1 page Aug. 1, 2000.

Komlodi, A., et al., Key Frame Preview Techniques For Video Browsing, Digital Library Research Group, College of Library and Information Services University of Maryland, pp. 118-125.

Appenzeller, G., et al., "User-Friendly Access Control For Public Network Ports", IEEE, pp. 699-707, Mar. 1999.

* cited by examiner

SYSTEM AND METHOD FOR DISABLING AND PROVIDING A NOTIFICATION FOR A DATA PROCESSING DEVICE

BACKGROUND

1. Field of the Invention

This invention relates generally to the field of data processing systems. More particularly, the invention relates to an improved system and method for disabling a data processing device which has been lost or stolen and/or providing a notification to whomever may find the data processing device.

2. Description of the Related Art

A variety of portable/wireless data processing devices have been introduced over the past several years. These include wireless personal digital assistants ("PDAs") such as the Palm® VIIx handheld, cellular phones equipped with data processing capabilities, and, more recently, corporate wireless messaging devices such as the Blackberry™ wireless pager developed by Research In Motion ("RIM").™

One problem which exists with portable data processing devices is that, due to their portable nature, they are inherently capable of being lost or stolen. While this is not as much of a concern for devices which include only limited storage capabilities (e.g., standard cell phones), it is a significant concern for devices capable of storing significant amounts of user data. For example, many portable devices are currently capable of storing various types of personal and/or business-related information, a significant amount of which may be confidential (e.g., word processing documents, e-mail messages, electronic calendar data, personal and business-related contact information, . . . etc).

Accordingly, what is needed is a system and method for disabling a lost or stolen data processing device to thereby prevent unauthorized access to sensitive information stored thereon. What is also needed is a system and method which will improve the chances that the data processing device will be returned to its rightful owner.

SUMMARY

A method for disabling a wireless data processing device is described comprising: receiving an indication from a user that the data processing device is missing; and responsively transmitting a disable command to the data processing device, the disable command disabling the data processing device using a first disabling technique.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for disabling and providing a notification for a data processing device. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of a Data Processing Service

Figure 1:
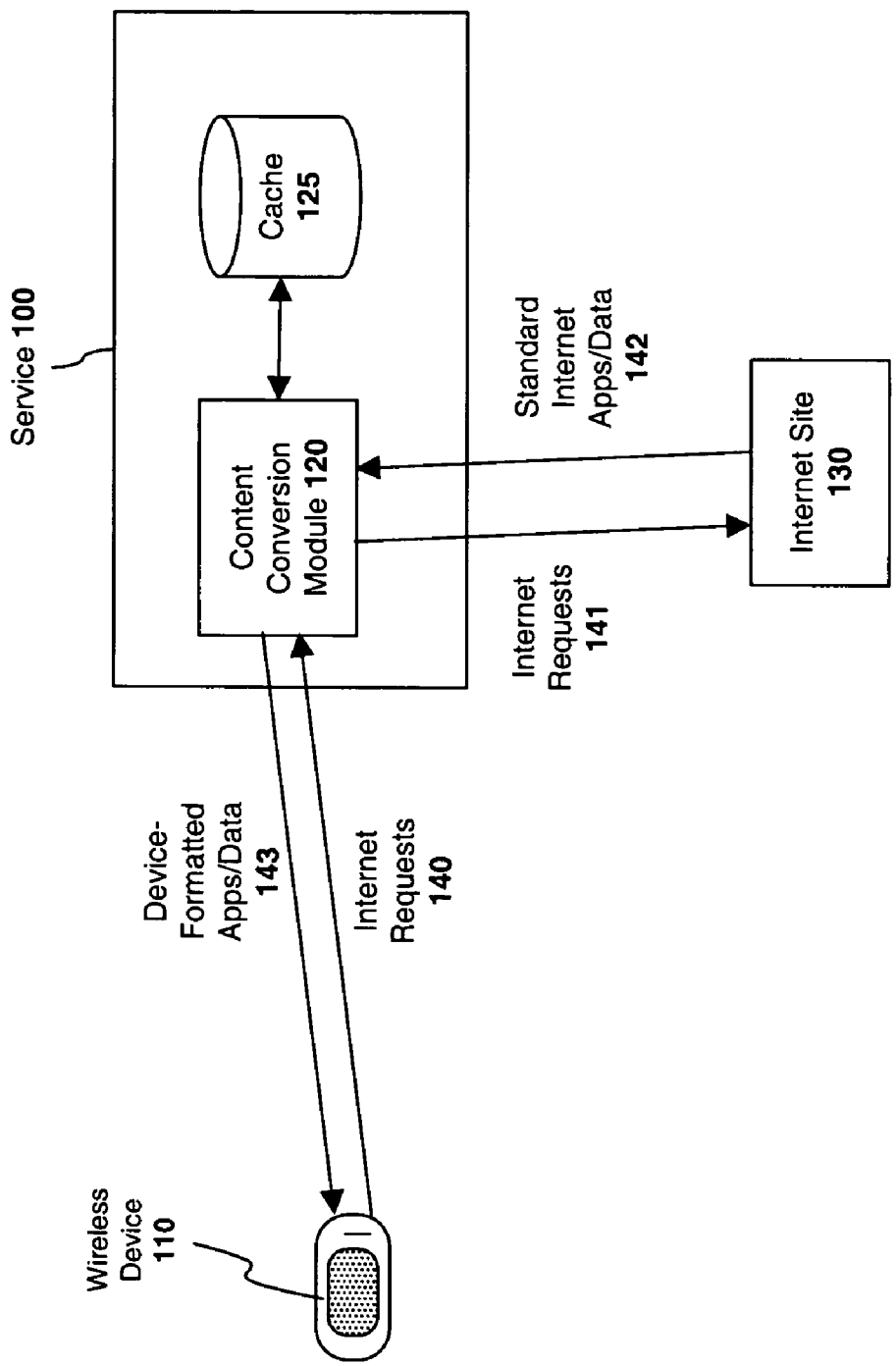
FIG. 1 illustrates one embodiment of a data processing service communicating with a data processing device.

Embodiments of the invention may be implemented on a data processing service 100 such as that illustrated generally in FIG. 1. The service 100, which may be comprised of one or more servers, provides a portal through which data processing devices 110 may access content (e.g., Web pages, multimedia content, e-mail, . . . etc) from external Internet sites 130. The service 100 is comprised of a plurality of servers 100. Embodiments of such a service 100 are described in co-pending application entitled NETWORK PORTAL SYSTEM, APPARATUS AND METHOD, Ser. No. 09/714,897, Filed Nov. 15, 2000 (hereinafter "Network Portal Application"), which is assigned to the assignee of the present application and which is incorporated herein by reference. Certain features of the service 100 will now be described followed by a detailed description of a system and method for disabling a data processing device.

In one embodiment, the service 100 converts standard applications and data into a format which each wireless data processing device 110 can properly interpret. Thus, as illustrated in FIG. 1, one embodiment of the service 110 includes a content conversion module 120 for processing requests for Internet content 140. More particularly, the service 100 acts as a proxy for the data processing device 110, forwarding Internet requests 14O, 141 to the appropriate Internet site 130 on behalf of the data processing device 110, receiving responses from the Internet site 130 in a standard Internet format (e.g., Web pages with embedded audio/video and graphical content, e-mail messages with attachments, . . . etc), and converting the standard Internet responses 142 into a format which the data processing device 110 can process (e.g., bytecodes as described in the Network Portal Application).

For example, the conversion module 120 may include a hypertext markup language ("HTML") rendering module (not shown) for interpreting HTML code and downloading any embedded content in the HTML code (e.g., graphics, video, sound, . . . etc) to the service 100. The conversion module 120 may then combine the HTML code and embedded content and generate a set of bytecodes for accurately reproducing the requested content on the data processing device 110. As described above, in one embodiment, the bytecodes may be Java bytecodes/applets. However, the conversion module 120 may generate various other types of interpreted and/or non-interpreted code, depending on the particular type of data processing device 110 being used (e.g., one with an interpreter module or one without).

Because one embodiment of the service 100 maintains an intimate knowledge of the capabilities/configuration of each data processing device 110 (e.g., screen size, graphics/audio capabilities, available memory, processing power, user preferences, . . . etc) it can reconstruct the requested Internet content accurately, while at the same time minimizing the bandwidth required to transmit the content to the device 110. For example, the conversion module 120 may perform pre-scaling and color depth adjustments to the requested content so that it will be rendered properly within the data processing device's 110's display. In making these calculations, the conversion may factor in the memory and processing power available on the data processing device 110. In addition, the conversion module 120 may compress the requested content using a variety of compression techniques, and thereby preserve network bandwidth.

In one embodiment, the conversion module 120 will simply discard Internet content which either cannot be reproduced on the data processing device 110, or which the user has indicated that he/she does not want to be reproduced on the portal device. For example, a user may indicate that he/she does not want sounds to be generated on the data processing device 110 or that he/she does not want advertisements transmitted to the data processing device 110. The conversion module 120 will then remove any sounds or advertisements embedded in the requested Web page (or other requested Internet content). Because HTML rendering and other advanced processing of Internet content/data is offloaded to the service 100 as described above, the data processing device 110 can be manufactured using a low power microprocessor or microcontroller, thereby lowering the cost of manufacture and/or the energy consumed by the device 110.

In one embodiment, when a particular Web page or other Internet object has been converted into a format suitable for execution on the data processing device 110 the formatted page/object may be stored locally on a cache 125 maintained at the service 100. The next time the content is requested, the conversion module 120 may simply read the previously-generated code from the local cache 125 (i.e., it will no longer need to retrieve the content from remote locations to reconstruct the code).

Various caching techniques and algorithms may be implemented to ensure that the cache 125 is storing Internet data efficiently (i.e., resulting in an acceptable percentage of cache 'hits') and that the data is current. For example, the service 100 may cache the most frequently-requested Internet data (e.g., the Yahoo™ home page), and may remove content from the cache based on a least-recently used caching policy. In addition, to ensure that data stored in the cache is current, the service 100 may compare the version of the data stored in the cache 125 with the version of data stored at the remote Internet site 130 when the data is requested. Similarly, the service 100 may store data in the cache 125 for some predetermined period of time before checking the remote server 130 for a new version. Various other Internet caching techniques may be employed while still complying with the underlying principles of the invention (e.g., those defined in the Internet Caching Protocol ("ICP") and/or the Cache Array Routing Protocol ("CARP")).

One embodiment of the data processing device 110 may support audio communications as well as (or in lieu of) data communications. In fact, the underlying principles of the invention are not limited to any particular type of wireless communication.

Device Disabling Embodiments

Figure 2:
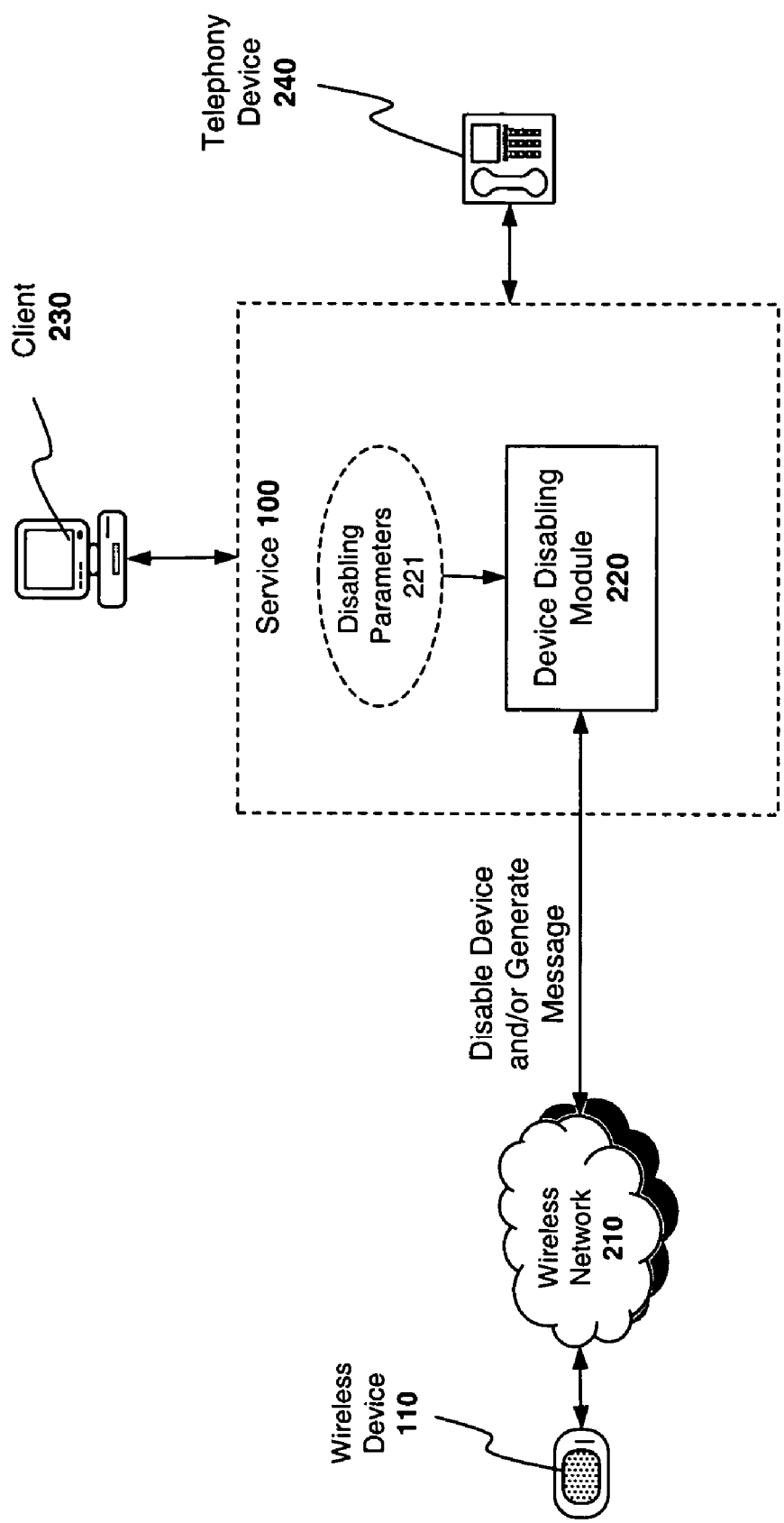
FIG. 2 illustrates one embodiment of a system and method for disabling a data processing device.

One embodiment of the service 100, illustrated in FIG. 2, is comprised of a device disabling module 220 for disabling wireless data processing devices 110 under certain circumstances. A predefined set of disabling parameters 221 define the particular conditions under which data processing devices 110 should be disabled.

In one embodiment, when a user's data processing device is lost or stolen, the user may notify the service 100 via an alternate communication channel. For example, the user may contact the service from a client computer 230 (e.g., the user's "desktop" computer). Communication between the client computer 230 and the service 100 may be by way of a direct dial-up connection and/or over the Internet (e.g., over a digital subscriber ("DSL") line or a dial-up connection provided by the user's Internet Service Provider). The service 100 may provide a World-Wide-Web interface through which the user may access his/her account information and notify the service 100 of the lost device.

In order to gain access to the account, the user will typically be required to enter a valid user ID and password. In addition, in one embodiment, the user may be required to provide additional authentication data before a device will be disabled such as, for example, a keyword or phrase stored on the service 100 for authentication purposes (e.g., the user's mother's maiden name). It should be noted, however, that the underlying principles of the invention are not limited to any particular type of user authentication process or user authentication data.

In one embodiment, the user may also contact the service 100 via a telephony device 240 (e.g., a standard telephone, wireless telephone, Internet telephone, . . . etc) and provide authentication data to the service via a touch-tone telephone keypad. Once authenticated, the service 100 may guide the user through a menu hierarchy navigable with the touch-tone keypad (e.g., using an interactive voice response ("IVR") unit or the like configured at the service 100). The menu hierarchy, in one embodiment, includes the option of disabling the user's data processing device. The user may also verbally communicate with a customer service representative who, after acquiring authentication data from the user, may disable the device 110 on behalf of the user.

In one embodiment, the device disabling module 220 may disable the device 110 without receiving a manual request to do so from the user. For example, if successive unsuccessful authentication attempts are made from the wireless device 110, the device disabling module 220 may automatically disable the device, under the assumption that an unauthorized user is attempting to gain access to the device 110 and/or the service 100. The user may specify the parameters 221 for which the device 110 will be automatically disabled.

In one embodiment, the device disabling module 220 may disable the wireless device 110 without the user's permission. For example, if the user's account is seriously overdue and the wireless device 110 is leased to the user, the device disabling module 220 may disable the device 110 until the user's balance is paid. Various additional disabling parameters 221 may be defined while still complying with the underlying principles of the invention.

In one embodiment, even when the device is disabled, certain safety functions will still be provided. For example, certain emergency-only telephone numbers may still be called from the device, under any circumstances (e.g., 911 or similar emergency numbers).

Once the device disabling module 220 determines that the device 110 should be disabled, it may cause the device 110 to be disabled in a variety of ways. In one embodiment, it simply transmits a "disable" command to the device 110 instructing the device to deactivate itself. The device 110 may either be disabled immediately or the next time it connects to the service 100. If extremely sensitive information is stored on the device, however, instant deactivation may be the preferred choice.

In one embodiment, the disable command is encoded in a communication channel other than the device's primary communications data link. For example, in one embodiment, a special Short Message Service ("SMS") message containing the command is transmitted to the device 110 from a trusted originating number. In another embodiment, a special phone call is made to the device 110 from a special number.

Once disabled, in one embodiment, a notice may be displayed on the device's LCD panel indicating that the device 110 is lost and/or disabled and requires reactivation. An example of such an embodiment of illustrated in FIG. 3. This embodiment will improve the chances that the device 110 will be returned to its rightful owner while at the same time protecting the confidentiality of the owner's stored information.

Figure 3:
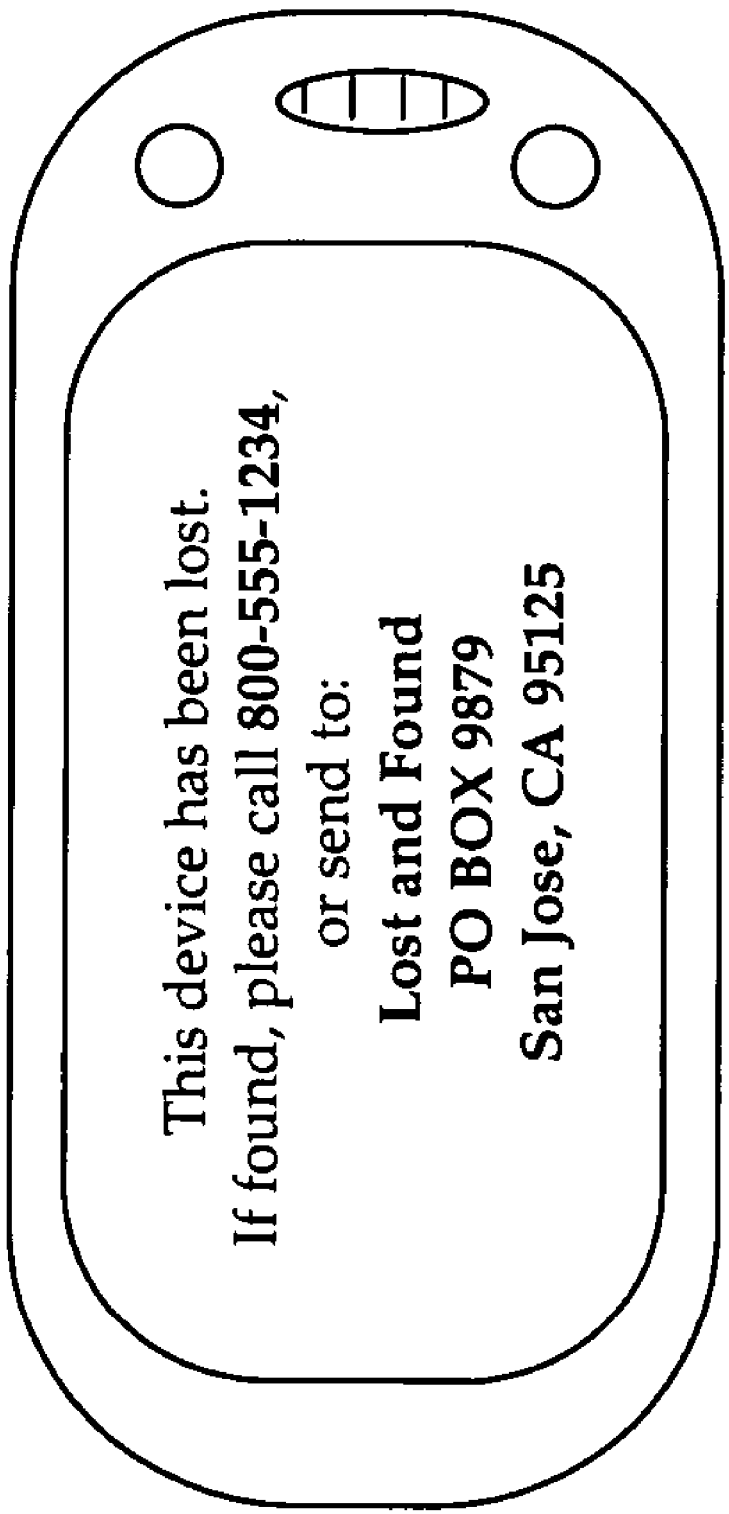
FIG. 3 illustrates a message on the display of a disabled data processing device.

As indicated in FIG. 3, a number may be provided to allow individuals to call the service 100. The service may subsequently send the user a shipping package for the device along with a prepaid postage sticker. Alternatively, or in addition, the service 100 may display a post office box to which the device 110 may be sent. In one embodiment, the PO Box will be designated as a prepaid postage PO Box (i.e., so that the sender will not be required to pay for shipping). In another embodiment, the device itself may display a prepaid postage indicator on its LCD screen (e.g., in the upper right corner, where it would typically be displayed) as well as an address to which the device 110 should be sent. The individual who finds the device may then simply drop the device directly in a mailbox.

In one embodiment, the user may specify the message to display on the screen of the lost device 110 from either the networked computer 230 or verbally, via the telephone 240. For example, the user may decide to include his/her telephone number in the displayed message. In other cases, the user may offer a reward for anyone who returns the device. Various other service- and user-specified messages may be employed while still complying with the underlying principles of the invention.

In one embodiment, several types of "deactivation" may be available, thereby requiring several different types of "reactivation." For example, in one embodiment, the device 110 may be deactivated in software (e.g., either at the operating system-level or at the application level) and may be reactivated using a particular password. The password may have been one previously selected by the user or the service. Alternatively, in one embodiment, when a user connects to the service 100 to deactivate the device 110, the service 100. transmits a reactivation password to the device 110 prior to deactivating it and concurrently transmits the password to the authenticated user (e.g., either verbally via telephone 240 and/or via e-mail, instant message or Web page transmitted to the client computer 230). The reactivation password may be randomly selected by the service 100 or may be known for the life of the device but only revealed to the user after receiving proper authentication. Using a service-selected, potentially random, reactivation password in this manner makes it less likely that an unauthorized user will be able to re-enable the data processing device 110 after it has been disabled by using information known about the device owner (i.e., which the owner might potentially use as a password, such as the owner's birthday, initials, mother's maiden name . . . etc).

The reactivation password may be entered at the device 110 directly by the device owner using an alphanumeric keypad or other input key configuration. Alternatively, or in addition, once the user indicates to the service 110 that the device has been found (e.g., via the client computer 230 or telephone 240), the service may transmit the reactivation password to the device 110, thereby automatically enabling the device 110.

Under certain conditions (e.g., if extremely sensitive information is stored on the device 110) the device 110 may be deactivated in a more permanent manner. For example, in one embodiment, non-volatile portions of the device (e.g., a Flash memory portion of the OS or BIOS) may be modified so as to render the device inoperable, in response to a command to do so from the service 100. In one embodiment, the only way for the device to subsequently be reactivated is to have it shipped back to the service for an initialization of the non-volatile memory.

In certain cases, the service 110 may erase all user data stored on the device either in lieu of, or in addition to deactivating the device 110. Prior to erasing the data, the service may perform a backup to preserve the user data on the service 100. As mentioned above, in one embodiment, the service 100 continually stores a backup of the user data, regardless of whether the device has been lost. As such, in this case, only the new user data (i.e., entered since the most recent backup) will be transmitted to the service 100 to preserve bandwidth and battery life of the device 110. Under any scenario, once the user receives a new device 110 (or finds the old device 110), the user data may be reinstalled from the service 100.

The above amendments do not add any new matter. They merely correct typographical mistakes.

In one embodiment, the user may select from any of the above types of device disabling. For example, if the user cannot locate the device, for the first few hours he/she may only want to password protect the device. However, after several days or weeks have passed, the user may wish to disable the device more permanently and/or erase all of the user data from the device. Various other device disabling combinations may be employed while still complying with the underlying principles of the invention.

Various network types may be employed to support communications between the wireless device 110 and the service 100 including, for example, packet-based networks such as Cellular Digital Packet Data ("CDPD") and Mobitex. It should be noted, however, that the underlying principles of the invention are not limited to any particular type of wireless network 210.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while embodiments of the invention described above employ a "service" 100 communicatively coupled between the wireless device 110 and the Internet, the particular service 100 described above is not required for complying with the underlying principles of the invention. Accordingly, the scope and spirit of the invention should be judged in terms of the claims which follow.

What is claimed is:

1. A method for disabling a data processing device comprising:
   providing a user with a plurality of options for remotely deactivating a data processing device, the options including (1) deactivating the data processing device in software, (2) deactivating the data processing device by modifying non-volatile portions of the data processing device and (3) deactivating the data processing device by erasing all user data on the data processing device;
   receiving an indication from a user to deactivate said data processing device in software, to modify said non-volatile portions of the data processing device or to erase all user data on the data processing device;
   responsively transmitting a first command to deactivate said data processing device in software in response to receipt of a user indication to deactivate said data processing device in software, or transmitting a second command to modify said non-volatile portions of said data processing device in response to receipt of a user indication to modify said non-volatile portions of said data processing device, or transmitting a third command to erase all user data on said data processing device in response to receipt of a user indication to erase all user data on the data processing device; and
   continually storing a new backup of said user data from the data processing device on a remote service, wherein said storing comprises transmitting new user data entered since a most recent backup from the data processing device to the remote service to be stored as part of the new backup prior to deactivating the data processing device.

2. The method as in claim 1 further comprising:
   displaying an indication that said data processing device is missing and contact information on a screen of said data processing device.

3. The method as in claim 2 wherein said contact information comprises an address to which said data processing device may be shipped, postage prepaid.

4. The method as in claim 2 wherein said contact information comprises a toll free telephone number to a wireless data service.

5. The method as in claim 1 wherein deactivating said data processing device in software comprises locking said data processing device until a valid reactivation password is provided to said data processing device.

6. The method as in claim 5 further comprising:
   transmitting said reactivation password to said data processing device prior to transmitting said command to deactivate said data processing device at said deactivation level.

7. The method as in claim 1 wherein said indication to deactivate said data processing device is received from a client computer communicatively coupled to a network.

8. The method as in claim 1 wherein said indication to deactivate said data processing device is received from a telephony device.

9. The method as in claim 5 further comprising:
   receiving an indication to reactivate said data processing device; and
   transmitting said reactivation password to said data processing device to reactivate said data processing device.

10. The method as in claim 9 wherein said indication further comprises authentication data authenticating the source of said indication.

11. The method as in claim 1 wherein modifying said non-volatile portions of said data processing device comprises:
    modifying said data processing device's BIOS.

12. The method as in claim 1 further comprising:
    backing up said user data entered since the most recent backup prior to erasing said user data.

13. The method as in claim 1 further comprising:
    transmitting a user-specified message to said data processing device, said user-specified message to be displayed on said data processing device's screen.

14. A system comprising:
    a wireless data processing device;
    a service to provide a user with a plurality of options for remotely deactivating a data processing device, the options including (1) deactivating the data processing device in software, (2) deactivating the data processing device by modifying non-volatile portions of the data processing device and (3) deactivating the data processing device by erasing all user data on the data processing device;
    the service to further receive an indication from a user to deactivate said data processing device in software, by deactivating the data processing device by modifying non-volatile portions of the data processing device or by deactivating the data processing device by erasing all user data on the data processing device;
    a device disabling module to responsively transmit a first command to deactivate said data processing device in software in response to receipt of a user indication to deactivate said data processing device in software, or transmit a second command to modify said non-volatile portions of said data processing device in response to receipt of a user indication to modify said non-volatile portions of said data processing device, or transmit a third command to erase all user data on said data processing device in response to receipt of a user indication to erase said user data on said data processing device; and
    the service to continually store a new backup of said user data from the data processing device on a remote service, wherein new user data entered since a most recent backup from the data processing device is transmitted to the remote service to be stored as part of the new backup prior to deactivating the data processing device.

15. The system as in claim 14 wherein said wireless data processing device displays contact information and an indication that said data processing device is missing.

16. The system as in claim 15 wherein said contact information comprises an address to which said data processing device may be shipped, postage prepaid.

17. The system as in claim 15 wherein said contact information comprises a toll free telephone number to a wireless data service.

18. The system as in claim 14 wherein deactivating said data processing device in software comprises locking said data processing device until a valid reactivation password is provided to said data processing device.

19. The system as in claim 18 wherein said device disabling module transmits said reactivation password to said data processing device prior to transmitting said command to deactivate said data processing device at said deactivation level.

20. The system as in claim 14 wherein said service receives said indication to deactivate said data processing device from a client computer communicatively coupled to said service over a network.

21. The system as in claim 14 wherein said service receives said indication to deactivate said data processing device from a telephony device.

22. The system as in claim 18 wherein said device disabling module transmits said reactivation password to said data processing device responsive to receiving an indication from said user to reactivate said data processing device.

23. The system as in claim 22 wherein said indication further comprises authentication data authenticating the source of said indication.

24. The system as in claim 14 wherein modifying said non-volatile portions of said data processing device comprises:
modifying said data processing device's BIOS.

25. The system as in claim 14 wherein said service backs up said user data entered since the most recent backup prior to erasing said user data.

26. The system as in claim 14 wherein said device disabling module transmits a user-specified message to said data processing device, said user-specified message to be displayed on said data processing device's screen.

27. A method comprising:
authenticating a user;
providing said user with a plurality of options for remotely deactivating said user's data processing devices the options including (1) deactivating the data processing device in software, (2) deactivating the data processing device by modifying non-volatile portions of the data processing device and (3) deactivating the data processing device by erasing all user data on the data processing device;
receiving an indication that said user has selected one of the said options to deactivate said user's data processing device,
transmitting a first deactivation command to said data processing device to deactivate said data processing device in software in response to receipt of a user indication to deactivate said data processing device in software, or transmit a second command to modify said non-volatile portions of said data processing device in response to receipt of a user indication to modify said non-volatile portions of said data processing device, or transmit a third command to erase all user data on said data processing device in response to receipt of a user indication to erase said user data on said data processing device; and
continually storing a new backup of said user data from the data processing device on a remote service, wherein said storing comprises transmitting new user data entered since a most recent backup from the data processing device to the remote service to be stored as part of the new backup prior to deactivating the data processing device.

28. The method as in claim 27 wherein said deactivating said data processing device in software comprises locking said data processing device until a valid reactivation password is provided to said data processing device.

29. The method as in claim 27 wherein said data processing device is deactivated such that said data processing device may be activated by a reactivation password.

30. The method as in claim 27 further comprising:
displaying contact information on a screen of said data processing device.

31. The method as in claim 30 wherein said contact information comprises a post office box for which postage is prepaid.

32. The method as in claim 27 further comprising:
transmitting a user-specified message to said data processing device said user-specified message to be displayed on a screen of said data processing device.

33. The method as in claim 28 further comprising:
randomly generating said reactivation password; and
providing an indication of said randomly generated password to said user.

34. The method as in claim 29 further comprising:
transmitting said reactivation password to said data processing device prior to transmitting said command to deactivate said data processing device.

35. The method as in claim 34 further comprising:
randomly generating said reactivation password; and
providing an indication of said randomly generated password to said user.

* * * * *